(12) United States Patent
Gomi

(10) Patent No.: US 9,024,258 B2
(45) Date of Patent: May 5, 2015

(54) ANALYSIS METHOD AND IMAGING APPARATUS

(71) Applicant: Seiko Epson Corporation, Tokyo (JP)

(72) Inventor: Tsugio Gomi, Fujimi (JP)

(73) Assignee: Seiko Epson Corporation (JP)

( * ) Notice: Subject to any disclaimer, the term of this patent is extended or adjusted under 35 U.S.C. 154(b) by 155 days.

(21) Appl. No.: 13/783,711

(22) Filed: Mar. 4, 2013

(65) Prior Publication Data

US 2013/0258314 A1 Oct. 3, 2013

(30) Foreign Application Priority Data

Mar. 28, 2012 (JP) ................................. 2012-074280

(51) Int. Cl.
| | | |
|---|---|---|
| G01J 5/00 | (2006.01) | |
| G01J 3/12 | (2006.01) | |
| G01J 3/10 | (2006.01) | |
| G01J 3/26 | (2006.01) | |
| G01J 3/28 | (2006.01) | |
| G01J 3/02 | (2006.01) | |

(52) U.S. Cl.
CPC .... G01J 3/12 (2013.01); G01J 3/10 (2013.01); G01J 3/26 (2013.01); G01J 3/2803 (2013.01); G01J 3/0272 (2013.01)

(58) Field of Classification Search
CPC ....................................................... G01J 3/12
USPC ........................................ 250/338.1; 356/51
See application file for complete search history.

(56) References Cited

U.S. PATENT DOCUMENTS

| | | |
|---|---|---|
| 6,614,533 B1 | 9/2003 | Hata |
| 8,063,976 B2 | 11/2011 | Kita |
| 2009/0067695 A1 * | 3/2009 | Komiya et al. ............... 382/128 |
| 2009/0185163 A1 | 7/2009 | Shimazu et al. |

FOREIGN PATENT DOCUMENTS

| | | |
|---|---|---|
| JP | 2000-329617 | 11/2000 |
| JP | 2006-105655 | 4/2006 |
| JP | 2009-033222 | 2/2009 |
| JP | 4319569 | 6/2009 |
| JP | 2009-168748 | 7/2009 |

\* cited by examiner

*Primary Examiner* — David Porta
*Assistant Examiner* — Abra Fein
(74) *Attorney, Agent, or Firm* — Harness, Dickey & Pierce, P.L.C.

(57) ABSTRACT

An analysis method includes spectroscopically separating light from a light source via a subject into plural wavelength ranges, imaging the subject with respect to each wavelength range, and thereby, acquiring plural spectroscopic images, dividing a subject image into plural areas in each of the spectroscopic images, analyzing a spectrum of the spectroscopically-separated lights of each area with respect to the plural spectroscopic images, and thereby, analyzing a spectral characteristic, and analyzing a component of the subject based on the spectral characteristic in at least one area of the plural areas, and has a pixel selection step of eliminating the area having the same spectral characteristic as the spectral characteristic with respect to the light from the light source from objects of the analysis of the component before the analyzing of the component.

8 Claims, 5 Drawing Sheets

ANALYSIS METHOD AND IMAGING APPARATUS

BACKGROUND

1. Technical Field

The present invention relates to an analysis method and an imaging apparatus.

2. Related Art

In related art, methods of analyzing calorie contents of foods based on near-infrared images obtained by imaging the foods using near-infrared cameras under illumination of near-infrared light sources have been known (for example, see Patent Document 1 (JP-A-2006-105655)).

A material has a property exhibiting an inherent characteristic with respect to light. As the inherent characteristic with respect to light, for example, an absorption characteristic of light may be cited. A material has a property of absorbing a light having a predetermined wavelength more easily than lights having other wavelengths. Further, the wavelengths of light to be easily absorbed vary depending on the materials. Using the property, by investigating the characteristic of the material with respect to light, the material may be identified and the component of the material may be analyzed. Generally, the analysis of the material characteristic with respect to wavelengths of light is called "spectroscopic analysis".

If the method disclosed in Patent Document 1 is used, the light from a food as a subject (corresponding to the above described material) is spectroscopically separated into plural wavelength ranges and imaging is performed with respect to each of the spectroscopically separated wavelength ranges and spectroscopic images are acquired, and thereby, the characteristic of the food with respect to light may be grasped. That is, by analyzing the plural spectroscopic images, the wavelength of light easily absorbed by the food or the components of the food is grasped, and accordingly, the food may be identified as the material corresponding to the easily-absorbed wavelength of the light and the component of the food may be analyzed.

However, depending on the subject, it may be easy to specularly reflect light from a light source on the surface of the subject. In imaging of the subject, if imaging is performed under the condition that the light from the subject contains the light specularly reflected by the subject (hereinafter, referred to as "specularly-reflected light"), it is difficult to accurately grasp the characteristic of the subject with respect to the light. In this case, the accuracy in the analysis of the subject and the components of the subject easily becomes lower.

That is, in the analysis method in related art, there has been a problem that it is difficult to improve the accuracy in the analysis.

SUMMARY

An advantage of some aspects of the invention is to solve at least a part of the problems described above, and the invention can be implemented as the following forms or application examples.

Application Example 1

This application example is directed to an analysis method including spectroscopically separating light from a light source via a subject into plural wavelength ranges, receiving spectroscopically-separated lights as lights with respect to each of the spectroscopically-separated wavelength ranges, imaging the subject with respect to each of the wavelength ranges, and thereby, acquiring plural spectroscopic images, dividing a subject image as an image of the subject into plural areas in each of the spectroscopic images, analyzing a spectrum of the spectroscopically-separated lights of each area with respect to the plural spectroscopic images, and thereby, analyzing a spectral characteristic showing a characteristic of the spectrum with respect to the wavelengths of the spectroscopically-separated lights, and analyzing a component of the subject based on the spectral characteristic in at least one area of the plural areas, wherein, at the analyzing of the component of the subject, the area having the same spectral characteristic as the spectral characteristic with respect to the light from the light source is eliminated from objects of the analysis of the component.

In the analysis method of the application example, at the acquiring of the plural spectroscopic images, the plural spectroscopic images are acquired by imaging the subject with respect to each wavelength range using the spectroscopically-separated lights with respect to each wavelength range.

At the analyzing of the spectral characteristic, the subject image of each spectroscopic image is divided into plural areas, and the spectral characteristic is analyzed with respect to each area. The spectral characteristic is the characteristic of the spectrum with respect to the wavelengths of the spectroscopically-separated lights.

At the analyzing of the component of the subject, the component of the subject is analyzed based on the spectral characteristic in at least one area of the plural areas.

Here, in the imaging of the subject, if the light from the subject contains specularly-reflected light, it is difficult to accurately grasp the spectral characteristic of the subject. In this case, the accuracy in the analysis of the component of the subject easily becomes lower.

Accordingly, in the analysis method, the method of eliminating the area having the same spectral characteristic as the spectral characteristic with respect to the light from the light source from the objects of the analysis of the component is employed. In the area in which the light from the light source is specularly reflected of the subject image, the spectral characteristic is the same as the spectral characteristic with respect to the light from the light source. Therefore, by eliminating the area having the same spectral characteristic as the spectral characteristic with respect to the light from the light source from the objects of the analysis of the component, the area containing the specularly-reflected light of the plural areas may be eliminated from the objects of the analysis of the component. Thereby, the spectral characteristic of the subject may be easily and accurately grasped, and the accuracy in the analysis of the component of the subject may be easily improved.

Application Example 2

This application example is directed to the analysis method described above, which further includes spectroscopically-separating reflected light obtained by reflecting the light from the light source by a reference material that specularly reflects the light from the light source into plural wavelength ranges, and grasping the spectral characteristic with respect to the light from the light source based on a result of receiving the spectroscopically-separated lights of each of the wavelength ranges and imaging the reference material with respect to each of the wavelength ranges.

In this application example, the spectral characteristic with respect to the light from the light source is grasped based on the result of imaging the reference material with respect to each of the wavelength ranges of the spectroscopically-separated lights, and the spectral characteristic with respect to the specularly-reflected light from the reference material may be grasped as the spectral characteristic with respect to the light from the light source.

Application Example 3

This application example is directed to the analysis method described above, wherein at the acquiring of the plural spectroscopic images, the subject and the reference material are imaged together.

In this application example, at the acquiring of the plural spectroscopic images, the subject and the reference material are imaged together, and thus, the spectral characteristic in the area of the subject and the spectral characteristic with respect to the light from the light source may be easily compared.

Application Example 4

This application example is directed to the analysis method described above, wherein the plural wavelength ranges include an infrared-light wavelength range.

In this application example, the plural wavelength ranges include the infrared-light wavelength range, and thus, the component of the subject may be analyzed based on the result of analysis of the characteristic of the subject with respect to infrared light.

Application Example 5

This application example is directed to the analysis method described above, wherein at the analyzing of the component of the subject, the component is analyzed with respect to each area.

In this application example, the component is analyzed with respect to each area, and thus, the component with respect to plural parts of the subject may be analyzed.

Application Example 6

This application example is directed to the analysis method described above, which further includes acquiring the plural spectroscopic images by receiving the spectroscopically-separated lights using an imaging device having plural pixels, wherein, at the analyzing of the spectral characteristic, when the subject image is divided into the plural areas, the pixels are used as component elements of the areas.

In this application example, when the subject image is divided into the plural areas, the pixels of the imaging device are used as component elements of the areas, and thus, received light data of the spectroscopically-separated lights may be sectioned with respect to each area.

Application Example 7

This application example is directed to the analysis method described above, wherein at the analyzing of the spectral characteristic, the subject image is divided into the plural areas by dividing the subject image with respect to each of the pixels.

In this application example, the subject image is divided into the plural areas by dividing the subject image with respect to each of the pixels, and thus, the received light data with respect to each pixel may be used as the received light data with respect to each area.

Application Example 8

This application example is directed to an imaging apparatus includes a spectroscopic device that spectroscopically separates light from a light source via a subject into plural wavelength ranges, an imaging device that receives spectroscopically-separated lights as lights with respect to each of the spectroscopically-separated wavelength ranges and images the subject, a spectral characteristic analysis unit that divides a subject image as an image of the subject into plural areas in each of plural spectroscopic images obtained by imaging of the subject with respect to each of the wavelength ranges, analyzes a spectrum of the spectroscopically-separated lights of each area with respect to the plural spectroscopic images, and thereby, analyzes a spectral characteristic showing a characteristic of the spectrum with respect to the wavelengths of the spectroscopically-separated lights, and a component analysis unit that analyzes a component of the subject based on the spectral characteristic in at least one area of the plural areas, wherein the component analysis unit eliminates the area having the same spectral characteristic as the spectral characteristic with respect to the light from the light source from objects of the analysis of the component.

In the imaging apparatus of this application example, the plural spectroscopic images may be acquired by imaging the subject with respect to each wavelength range using the spectroscopically-separated lights with respect to each wavelength range. The subject image is divided into plural areas in each spectroscopic image, the spectrum of the spectroscopically-separated lights is analyzed for each area with respect to the plural spectroscopic images, and thereby, the spectral characteristic is analyzed with respect to each area. The spectral characteristic is the characteristic of the spectrum with respect to the wavelengths of the spectroscopically-separated lights. Further, the component of the subject is analyzed based on the spectral characteristic in at least one area of the plural areas.

Here, in the imaging of the subject, if the light from the subject contains specularly-reflected light, it is difficult to accurately grasp the spectral characteristic of the subject. In this case, the accuracy in the analysis of the component of the subject easily becomes lower.

Accordingly, in the imaging apparatus, the area having the same spectral characteristic as the spectral characteristic with respect to the light from the light source is eliminated from the objects of the analysis of the component by the component analysis unit. In the area in which the light from the light source is specularly reflected of the subject image, the spectral characteristic is the same as the spectral characteristic with respect to the light from the light source. Therefore, by eliminating the area having the same spectral characteristic as the spectral characteristic with respect to the light from the light source from the objects of the analysis of the component, the area containing the specularly-reflected light of the plural areas may be eliminated from the objects of the analysis of the component. Thereby, the spectral characteristic of the subject may be easily and accurately grasped, and the accuracy in the analysis of the component of the subject may be easily improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment will be explained with reference to the drawings.

Figure 1:
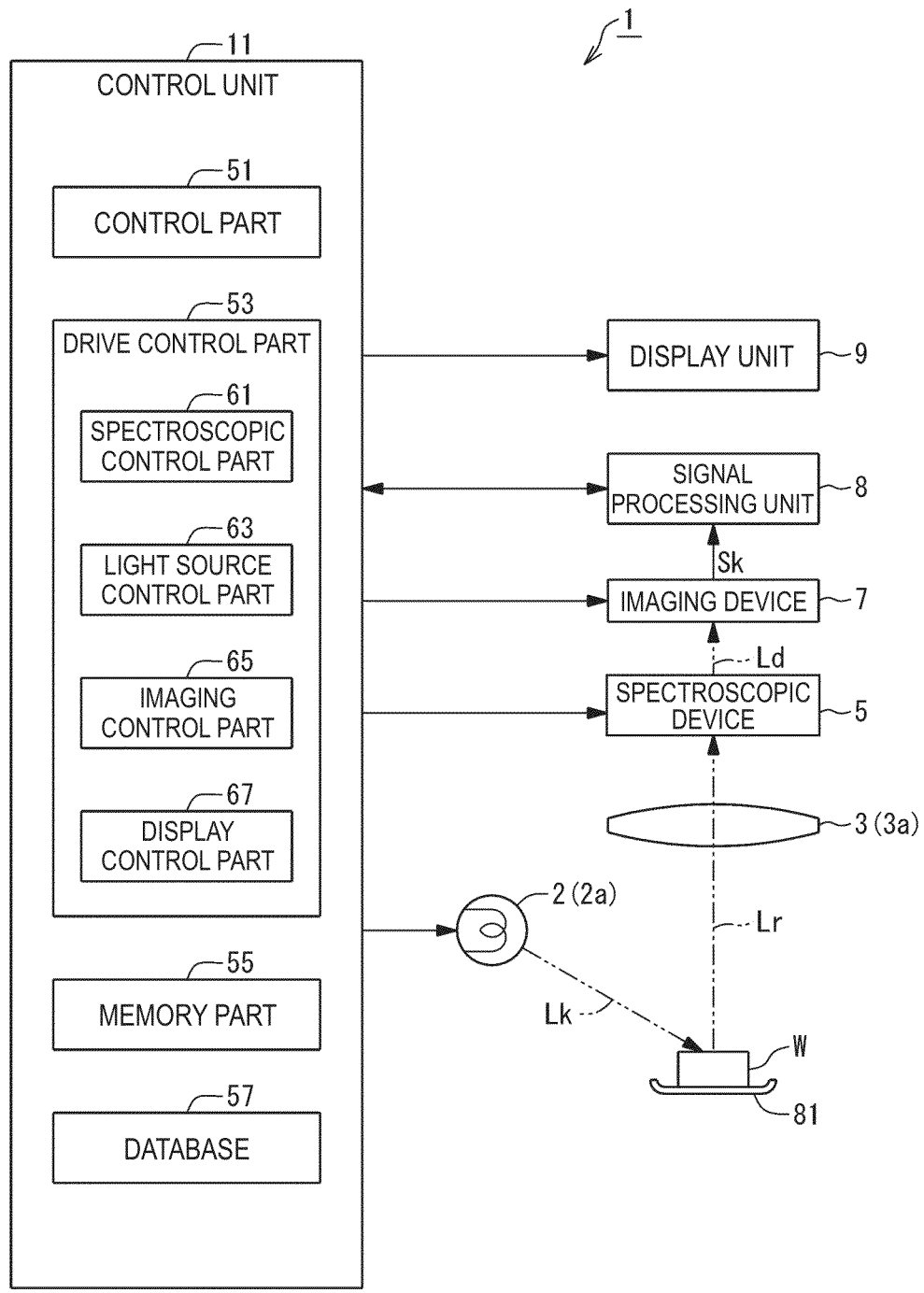
FIG. 1 is a block diagram showing a schematic configuration of an imaging apparatus in an embodiment.

As shown in FIG. 1 as a block diagram, an imaging apparatus 1 in the embodiment has a light source unit 2, an imaging system 3, a spectroscopic device 5, an imaging device 7, a signal processing unit 8, a display unit 9, and a control unit 11. The imaging apparatus 1 may analyze components of a subject W such as a food based on a result of imaging of the subject W.

Figure 2:
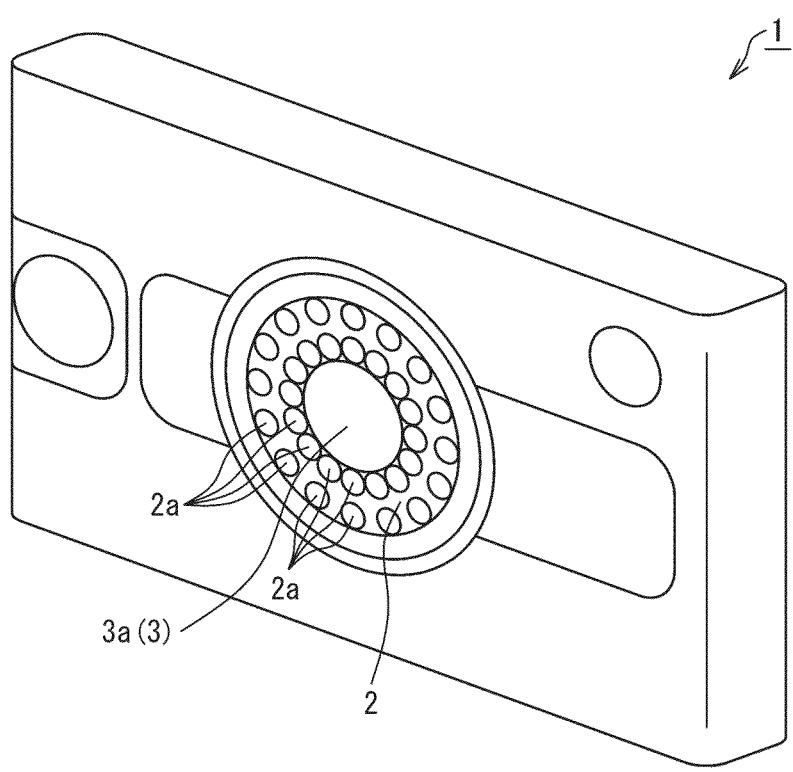
FIG. 2 is a perspective view showing the imaging apparatus in the embodiment.

As shown in FIG. 2 as a perspective view showing the imaging apparatus 1, the light source unit 2 has plural light sources 2a. In the embodiment, LEDs (Light Emitting Diodes) are employed as the light sources 2a. The plural light sources 2a are annularly arranged outside of an imaging lens 3a of the imaging system 3 and surround the imaging lens 3a.

As shown in FIG. 1, the light source unit 2 emits light Lk to be applied to the subject W. The light Lk contains lights in a range of wavelengths from 600 nm to 1200 nm. The light Lk applied from the light source unit 2 to the subject W enters the imaging system 3 as reflected light Lr via the subject W. Note that the reflected light Lr contains diffused reflected lights. The diffused reflected lights are lights of the light Lk scattered within the subject W and radiated to the outside of the subject W.

The imaging system 3 has the imaging lens 3a. The reflected light Lr from the subject W enters the imaging lens 3a, through the imaging system 3, and enters the spectroscopic device 5.

The spectroscopic device 5 spectroscopically separates the reflected light Lr entering the spectroscopic device 5 into plural wavelength ranges. As the spectroscopic device 5, for example, an optical device such as an interference filter may be employed.

In the embodiment, the spectroscopic device 5 outputs spectroscopically-separated lights Ld corresponding to the wavelength ranges with respect to each spectroscopically-separated wavelength range. That is, the spectroscopic device 5 may selectively output the spectroscopically-separated lights Ld in the narrower wavelength range than the wavelength range covering the entire reflected light Lr from the reflected light Lr. In other words, the spectroscopic device 5 may change the wavelength of the output spectroscopically-separated lights Ld in the wavelength range covering the entire reflected light Lr. Among interference filters, a filter that may change the wavelengths of the output spectroscopically-separated lights Ld is referred to as "tunable interference filter". In the embodiment, an etalon is used as the tunable interference filter.

The spectroscopic device 5 will be explained in detail.

Figure 3:
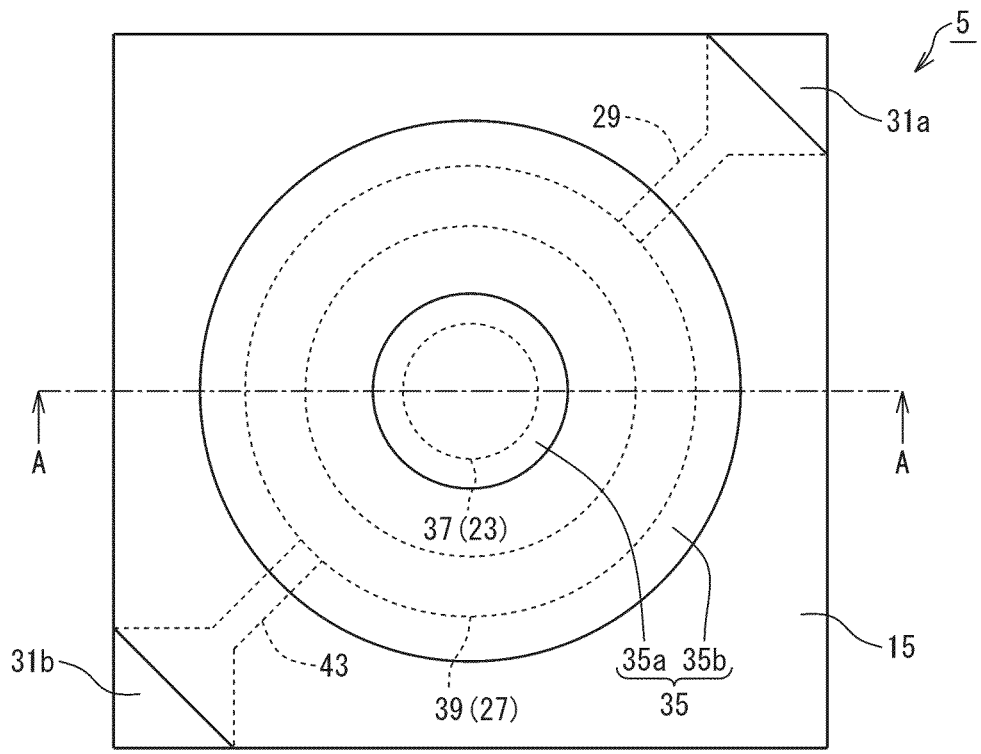
FIG. 3 is a plan view showing a spectroscopic device in the embodiment.
Figure 4:
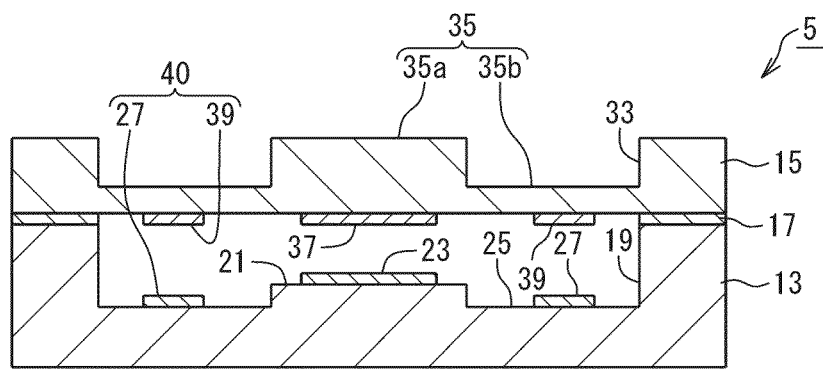
FIG. 4 is a sectional view along A-A line in FIG. 3.

As shown in FIG. 3 as a plan view, the spectroscopic device 5 is a plate-like optical member having a square shape in a plan view, 10 mm on a side, for example. As shown in FIG. 4 as a sectional view along A-A line in FIG. 3, the spectroscopic device 5 includes a first substrate 13 and a second substrate 15.

These first substrate 13 and second substrate 15 are respectively formed using light-transmissive base materials of various kinds of glass of quartz glass, soda glass, crystalline glass, lead glass, potassium glass, borosilicate glass, alkali-free glass, etc. or quartz, for example, and formed by etching of the plate-like base materials.

Further, the spectroscopic device 5 is formed by integrally bonding the first substrate 13 and the second substrate 15. The bonding is fixed by coupling a bonding film 17 provided in the bonding part between the first substrate 13 and the second substrate 15. As the bonding film 17, a plasma-polymerized film with polyorganosiloxane as a principal component is employed.

The bonding method between the first substrate 13 and the second substrate 15 is not limited to that. As the bonding method, various bonding methods of bonding using an adhesive material such as an adhesive agent, bonding using metal films, etc. may be employed.

The first substrate 13 may be formed by etching of a base material having a thickness of 500 μm, for example. In the first substrate 13, a first recess part 19 circularly recessed is provided by etching.

In the bottom part of the first recess part 19, a cylindrically projecting reflection film formation part 21 is provided at the center. Around the reflection film formation part 21, a lower region than the reflection film formation part 21 is set as an electrode formation part 25.

A first reflection film 23 is provided in the reflection film formation part 21 of the first recess part 19. The first reflection film 23 has a reflection characteristic and a transmission characteristic of light.

For the first reflection film 23, for example, a metal film of Ag or the like or an Ag alloy or the like may be used. Further, as a film forming the first reflection film 23, for example, a dielectric multilayer film having a configuration formed by stacking a high-refractive-index layer of titanium oxide and a low-refractive-index layer of silicon oxide may be employed. Furthermore, as the first reflection film 23, a configuration of a film formed by stacking a metal film (or an alloy film) on the dielectric multilayer film, a film formed by stacking the dielectric multilayer film on a metal film (or an alloy film), a film formed by stacking a single-layer refractive layer (titanium oxide, silicon oxide, or the like) and a metal film (or an alloy film), or the like may be employed.

In the electrode formation part 25, a ring-shaped first drive electrode 27 is formed to surround the first reflection film 23 in the plan view. Note that the first drive electrode 27 is connected to an extraction electrode 29 as shown in FIG. 3.

The first drive electrode 27 and the extraction electrode 29 are conducting films and, for example, ITO (Indium Tin Oxide) films or the like are used therefor. Further, for the conducting films, Cr/Au films formed by using Cr films as foundations and stacking Au films thereon may be used.

The extraction electrode 29 is connected to a connection pad 31a formed in one corner part of four corners of the first substrate 13. That is, the first drive electrode 27 is electrically conducted to the connection pad 31a via the extraction electrode 29.

The second substrate 15 may be formed by etching of one surface of a base material having a thickness of 200 μm, for example. In the second substrate 15, as shown in FIG. 4, a second recess part 33 is formed. In the spectroscopic device 5, the second recess part 33 is provided at the side of the second substrate 15 opposite to the first substrate 13 side. In the spectroscopic device 5, the second recess part 33 is formed in a direction concave toward the first substrate 13 side from the side of the second substrate 15 opposite to the first substrate 13 side. The second recess part 33 is annularly provided in the plan view. The second recess part 33 may be formed by etching.

The second recess part 33 forms a diaphragm 35. The diaphragm 35 includes a movable part 35a and a thinner part 35b. The movable part 35a is cylindrically formed around the substrate center. The thinner part 35b is provided around the movable part 35a and holds the movable part 35a. The thickness of the thinner part 35b is formed to be thinner than the thickness of the movable part 35a.

The second recess part 33 forms the thinner part 35b of the diaphragm 35 so that the movable part 35a may be easily moved in the thickness direction of the second substrate 15.

On the second substrate 15, a second reflection film 37 and a second drive electrode 39 are provided. In the second substrate 15, the second reflection film 37 and the second drive electrode 39 are respectively provided on the surface directed toward the first substrate 13 side.

The second reflection film 37 is provided in a circular shape in the plan view, and provided in a region overlapping with the movable part 35a. That is, the movable part 35a and the second reflection film 37 overlap in the plan view. Further, the second reflection film 37 faces the first reflection film 23 via a gap. The second reflection film 37 has a reflection characteristic and a transmission characteristic of light. For the second reflection film 37, the same material and configuration as those of the first reflection film 23 may be employed.

The second drive electrode 39 is provided in an annular shape in the plan view, and surrounds the second reflection film 37. The second drive electrode 39 is provided in the region overlapping with the thinner part 35b in the plan view. That is, the thinner part 35b and the second drive electrode 39 overlap in the plan view. Further, the second drive electrode 39 faces the first drive electrode 27 via a gap.

In the spectroscopic device 5, the first drive electrode 27 and the second drive electrode 39 facing each other via the gap form an electrostatic actuator 40.

Note that the second drive electrode 39 is connected to an extraction electrode 43 as shown in FIG. 3.

The second drive electrode 39 and the extraction electrode 43 are conducting films and, for example, ITO films or the like are used therefor. Further, for the conducting films, Cr/Au films formed by using Cr films as foundations and stacking Au films thereon may be used.

The extraction electrode 43 is connected to a connection pad 31b formed in one corner part of the four corners of the first substrate 13 using a conducting adhesive (not shown) such as Ag paste, and the first substrate 13 is electrically conducted to the second substrate 15.

In the spectroscopic device 5 having the above described configuration, when the electrostatic actuator 40 is driven by application of a voltage between the first drive electrode 27 and the second drive electrode 39, attractive force acts between the first drive electrode 27 and the second drive electrode 39 by the electrostatic force. By the attractive force, the thinner part 35b of the second substrate 15 bends and the movable part 35a moves closer to the first substrate 13. Thereby, the gap between the first reflection film 23 and the second reflection film 37 changes (becomes smaller). That is, in the spectroscopic device 5, by driving the electrostatic actuator 40, the gap dimension between the first reflection film 23 and the second reflection film 37 may be changed. Further, the wavelength of the light output from the spectroscopic device 5 may be changed in response to the gap dimension.

As shown in FIG. 1, the spectroscopically-separated lights Ld output from the spectroscopic device 5 are received by the imaging device 7. The imaging device 7 has plural image sensing devices (not shown). In the imaging device 7, the plural image sensing devices are arranged in a matrix form. An address of the arrangement is made to correspond to each image sensing device as one pixel. That is, one image sensing device is made to correspond to one pixel. Accordingly, the imaging device 7 has a configuration in which the plural pixels are arranged in a matrix form. Note that, as the image sensing device, for example, a CCD (Charge Coupled Device) or the like may be employed.

The imaging device 7 outputs a detection signal Sk in response to the amount of the spectroscopically-separated light Ld received for each pixel with respect to each pixel. The detection signals Sk output from the imaging device 7 are input to the signal processing unit 8. The signal processing unit 8 performs various processing on the detection signals Sk and outputs the detection signals Sk to the control unit 11. As processing performed by the signal processing unit 8 on the detection signals Sk, for example, conversion processing of electrically and mutually converting currents and voltages shown in the detection signals Sk, amplification processing of amplifying the detection signals Sk, A/D conversion processing of mutually converting analog values and digital values, or the like may be cited.

As described above, the plural pixels are arranged in the matrix form in the imaging device 7, and thus, by bundling the detection signals Sk from the plural pixels as single image data in a matrix form, an image may be represented. That is, in the imaging apparatus 1, the subject W may be taken as an image by the imaging device 7.

The image taken by the imaging device 7 may be displayed on the display unit 9. As the display unit 9, for example, a liquid crystal display device, an organic EL (Electro Luminescence) display device, or the like may be employed.

The control unit 11 has a control part 51, a drive control part 53, a memory part 55, and a database 57.

The control part 51 includes a CPU (Central Processing Unit) or the like, for example, and the operation of the imaging apparatus 1 is overall-controlled.

The drive control part 53 has a spectroscopic control part 61, a light source control part 63, an imaging control part 67, and a display control part 69. The spectroscopic control part 61 controls the drive of the spectroscopic device 5 according to a command from the control part 51. The light source control part 63 controls the drive of the light source unit 2 according to a command from the control part 51. The imaging control part 67 controls the drive of the imaging device 7 according to a command from the control part 51. The display control part 69 controls the drive of the display unit 9 according to a command from the control part 51.

The memory part 55 includes a RAM (Random Access Memory), a ROM (Read Only Memory), or the like. In the memory part 55, a data development part as a region in which various data is temporarily developed is set. As the data developed in the data development data, for example, program data of analysis processing on the analysis of the subject W or the like, the above described image data, or the like may be cited.

In the database 57, various data on the analysis of the subject W is stored. The data stored in the database 57 includes V-λ data representing ratios of voltages V applied to the electrostatic actuator 40 of the spectroscopic device 5 to wavelengths λ of the spectroscopically-separated lights Ld, calibration curve data showing calibration curves representing ratios of spectroscopic spectra to amounts of components, etc.

In the imaging apparatus 1 having the above described configuration, the components of the subject W may be analyzed by a spectroscopic analysis of the reflected light Lr from the subject W.

In the spectroscopic analysis, first, under the condition that the light Lk from the light source unit 2 is applied to the subject W, the reflected light Lr entering the spectroscopic device 5 is spectroscopically separated into plural wavelength ranges and the subject W is imaged with respect to each wavelength range. Note that the spectroscopic separation of the reflected light Lr is performed by driving the electrostatic actuator 40 of the spectroscopic device 5 used on the V-λdata.

Then, the intensity of the spectroscopically-separated lights Ld (spectroscopic spectrum) in the subject W is measured based on the results of imaging with respect to each wavelength range (hereinafter, referred to as "spectroscopic image with respect to each wavelength range").

Then, the characteristic of the spectroscopic spectrum (spectral characteristics) with respect to the wavelengths of the spectroscopically-separated lights Ld is analyzed based on the results measured with respect to each wavelength range.

By the spectroscopic analysis, the wavelengths of the lights easily absorbed by the subject W may be grasped. Thereby, the material forming the subject W may be identified as the material corresponding to the easily-absorbed wavelengths of the light or the component of the subject W may be analyzed.

Figure 5:
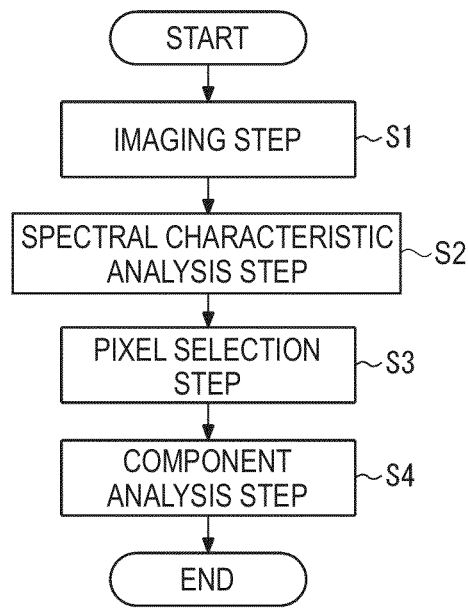
FIG. 5 is a flowchart showing a flow of an analysis method in the embodiment.

In the embodiment, as the method of analyzing the component of the subject W, the analysis method as shown in FIG. 5 is employed. In the analysis method, various computations and processing to be described later are performed by the control part (FIG. 1). Here, a fruit is exemplified as the subject W, and the sugar content of the fruit is exemplified as the component to be analyzed.

In the analysis method in the embodiment, first, at an imaging step S1, spectroscopic images of the subject W are taken with respect to each wavelength range of the reflected light Lr.

Note that, in the embodiment, at the imaging step S1, a method of spectroscopically separating the reflected light Lr into plural wavelength ranges in a range of wavelengths from 600 nm to 1200 nm is employed. In the embodiment, the wavelength range of 600 nm from 600 nm to 1200 nm is divided into 60 wavelength ranges at intervals of 10 nm. Further, with respect to each of the 60 wavelength ranges, the reflected light Lr is spectroscopically separated into spectroscopically-separated lights Ld of predetermined wavelengths within the respective wavelength ranges. The wavelength intervals of the plural spectroscopically-separated lights Ld spectroscopically-separated with respect to each of the plural wavelength ranges may be equal or not.

Figure 6:
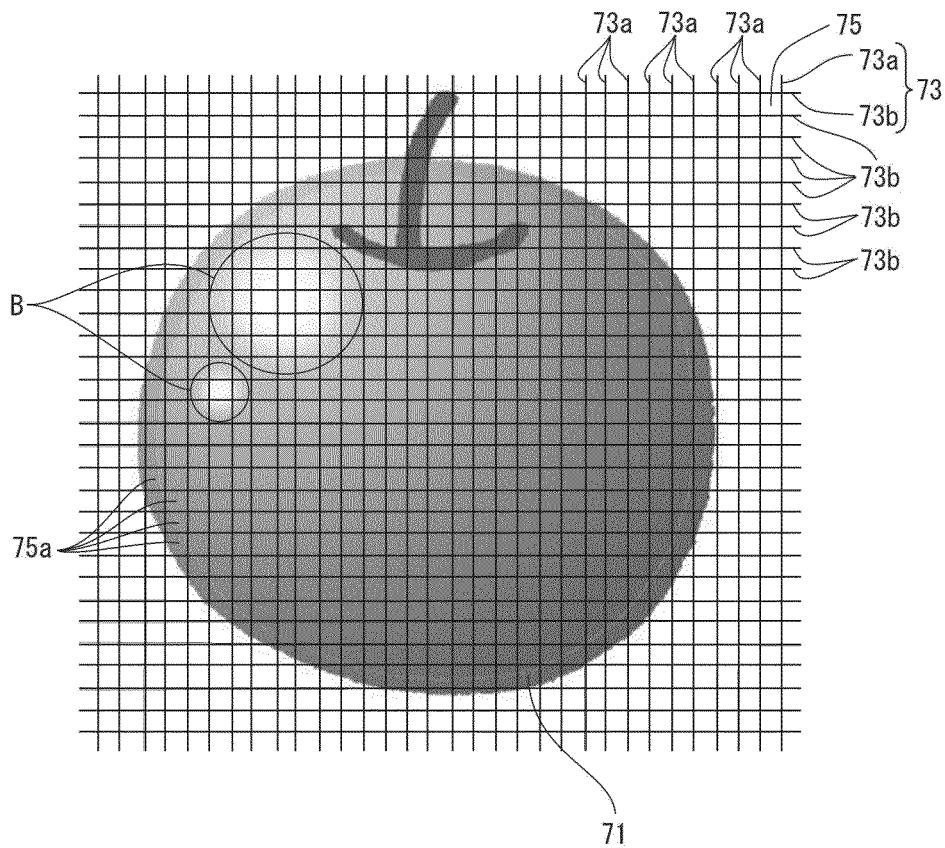
FIG. 6 schematically shows an example of spectroscopic images in the embodiment.

At the imaging step S1, plural spectroscopic images are acquired. Image data on the acquired spectroscopic images is stored in the memory part 55 (FIG. 1). In this regard, as shown in FIG. 6, a subject image 71 as an image of the subject W is represented in the spectroscopic images. In FIG. 6, grid lines 73 forming a matrix form show areas of pixels 75. The area surrounded by a row line 73a and a column line 73b of the grid lines 73 is exemplified as the area of the pixel 75.

Then, at a spectral characteristic analysis step S2, the spectral characteristic is analyzed with respect to each of the plural pixels 75 on the subject image 71 of all pixels 75 in the spectroscopic images shown in FIG. 6. Thereby, the subject image 71 is divided into plural areas and the spectral characteristic may be analyzed with respect to each area.

Then, at a pixel selection step S3, the pixels 75 adapted to the component analysis (the sugar content analysis in this example) are selected among the plural pixels 75 on the subject image 71. At the pixel selection step S3, first, with respect to each of the plural pixels 75 on the subject image 71, whether or not the spectral characteristic of the pixel 75 is the same as the spectral characteristic of the light Lk from the light source unit 2 is determined. Then, by eliminating (determining to be not adapted) the pixels 75 determined to have the same spectral characteristic as that of the light Lk from the light source unit 2, the pixels 75 adapted to the sugar analysis are selected as adapted pixels 75a.

For example, in the spectroscopic images shown in FIG. 6, in areas of B parts, the light Lk from the light source unit 2 is specularly reflected on the surface (surface-reflected) of the subject W. Therefore, the spectral characteristics in the B-part areas are the same as the spectral characteristic of the light Lk from the light source unit 2. In the areas, it is difficult to grasp the accurate spectral characteristic of the subject W. In this case, the accuracy in the component analysis of the subject W easily becomes lower.

Accordingly, in the embodiment, a method of eliminating the pixels 75 determined to have the same spectral characteristic as that of the light Lk from the light source unit 2 from the component analysis objects is employed. Note that the data on the spectral characteristic of the light Lk from the light source unit 2 (hereinafter, referred to as "light source spectrum data") is stored in the database 57. At the pixel selection step S3, whether or not the spectral characteristics of the pixel 75 is the same as the spectral characteristic of the light Lk from the light source unit 2 is determined with reference to the light source spectrum data read out from the database 57.

Then, at a component analysis step S4, the sugar content is computed with respect to each of the adapted pixels 75a.

The sugar contained in the subject W has a wavelength of light easily absorbed (hereinafter, referred to as "absorption wavelength"). With respect to the sugar, by checking the absorbance of the spectroscopically-separated light Ld at the absorption wavelength against the calibration curve data stored in the database 57, the amount of the component may be computed.

Given that the spectroscopic spectrum of the adapted pixel 75a at the absorption wavelength λs of sugar is Ig and the spectroscopic spectrum at the absorption wavelength with respect to the light Lk from the light source unit 2 is Io, the absorbance As of the spectroscopically-separated light Ld with respect to the adapted pixel 75a may be calculated by the following equation (1).

$$\text{Absorbance As} = -\log(Ig/Io) \tag{1}$$

The absorbance As calculated by the equation (1) is proportional to the concentration of the sugar in the subject W. Accordingly, by checking the absorbance As against the calibration curve data, the sugar content of the subject W may be computed.

In the above described manner, the sugar content of the subject W may be analyzed. In the embodiment, the sugar content may be analyzed with respect to each adapted pixel 75a on the subject image 71, and thus, the sugar content may be analyzed with respect to each segmentalized part of the subject W.

In the case where the sugar content in the entire subject W is analyzed, for example, the average value of sugar contents in the plural adapted pixels 75a may be employed.

Figure 7:
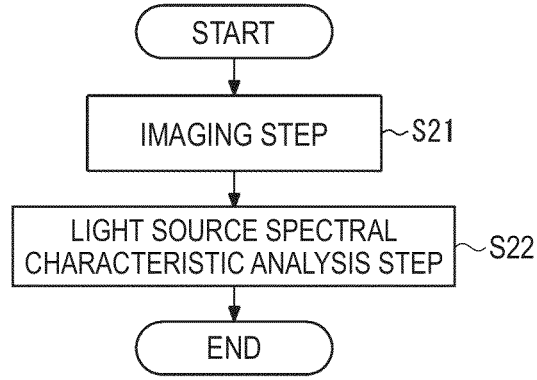
FIG. 7 is a flowchart showing a flow of a grasping method of light source spectral characteristics in the embodiment.

A method of grasping the spectral characteristic of the light Lk from the light source unit 2 (light source spectral characteristic) will be explained. In the embodiment, the grasping method shown in FIG. 7 is employed. In the grasping method, various computation and processing to be described later are performed by the control part 51 (FIG. 1).

In the grasping method of the light source spectral characteristic, first, at an image step S21, spectroscopic images of a reference material are taken by the imaging apparatus 1. The reference material has a property of specularly reflecting at least light over a wavelength range from 600 nm to 1200 nm. The reference material includes a material referred to as "white calibration plate", "white standard plate", or the like.

At the imaging step S21, reflected light Lk obtained by application of light Lk to the reference material is spectroscopically-separated into plural wavelength ranges, the reference material is imaged with respect to each wavelength range, and thereby, the spectroscopic images of the reference material are acquired. Note that the spectroscopic separation method is the same as the spectroscopic separation method in the above described analysis method, and its detailed explanation will be omitted.

Then, at a light source spectral characteristic analysis step S22, the characteristic of the spectroscopic spectrum with respect to the wavelengths is analyzed by measuring the spectroscopic spectrum in the reference material with respect to each wavelength range based on the spectroscopic images with respect to each wavelength range. Thereby, the light source spectral characteristic may be grasped.

In this regard, the light source spectrum data on the grasped light source spectral characteristic is stored in the database 57.

In the embodiment, the imaging step S1 corresponds to the step of acquiring the plural spectroscopic images, the spectral characteristic analysis step S2 corresponds to the step of analyzing the spectral characteristic, and the component analysis step S4 corresponds to the step of analyzing the component of the subject. Further, the processing at the spectral characteristic analysis step S2 corresponds to a spectral characteristic analysis unit and the processing at the component analysis step S4 and the pixel selection step S3 corresponds to a component analysis unit.

In the embodiment, by eliminating the pixels 75 having the same spectral characteristic as the light source spectral characteristic from the component analysis objects, the pixels 75 including the specularly-reflected lights of the plural pixels 75 may be eliminated from the component analysis objects. Thereby, the spectral characteristic of the subject W may be easily and accurately grasped, and the accuracy in the component analysis of the subject W may be easily improved.

Note that, in the embodiment, in the analysis method, the processing on the grasping of the light source spectral characteristic has been different from the processing on the component analysis of the subject W. However, the analysis method is not limited to that. As the analysis method, for example, as shown in FIG. 8, an analysis method of integrating the processing may be employed.

Figure 8:
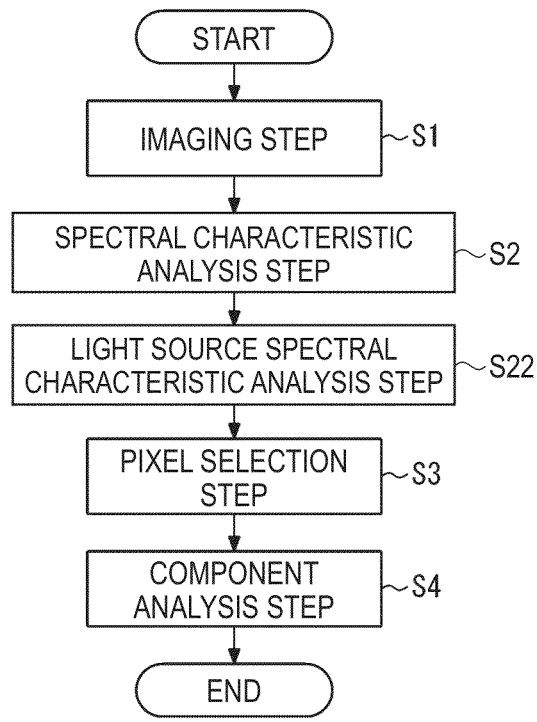
FIG. 8 is a flowchart showing a flow of an analysis method in the embodiment.

In the analysis method shown in FIG. 8, at the imaging step S1 the subject W and the reference material are imaged together. Then, at the spectral characteristic analysis step S2, the spectral characteristic on the subject image 71 is analyzed. Then, at the light source spectral characteristic analysis step S22, the light source spectral characteristic is analyzed.

In the analysis method, since the subject W and the reference material are imaged together, the spectral characteristic in the subject image 71 and the light source spectral characteristic may be easily compared. Further, in the analysis method, since the subject W and the reference material are imaged together, environments, conditions, etc. at imaging may be unified. Accordingly, the selection accuracy of the adapted pixels 75*a* may be easily improved. As a result, the accuracy in the analysis of the component of the subject may be easily improved.

In this case, a dish 81 (FIG. 1) on which the subject W is mounted may be used as the reference material.

Note that, in the analysis method shown in FIG. 8, the sequence of performing the light source spectral characteristic analysis step S22 after the spectral characteristic analysis step S2 has been employed. However, the sequence of the step S2 and the step S22 is not limited to that, and a sequence of performing the step S2 after the step S22 may be employed.

Note that, in the embodiment, the imaging apparatus 1 has been formed as the portable camera. However, the form of the imaging apparatus 1 is not limited to that. As the form of the imaging apparatus 1, for example, it may be built in a cellular phone or a digital still camera.

The entire disclosure of Japanese Patent Application No. 2012-074280, filed Mar. 28, 2012, is expressly incorporated by reference herein.

What is claimed is:

1. An analysis method comprising:
   spectroscopically separating light from a light source via a subject into plural wavelength ranges, receiving spectroscopically-separated lights as lights with respect to each of the spectroscopically-separated wavelength ranges, imaging the subject with respect to each of the wavelength ranges, and thereby, acquiring plural spectroscopic images;
   dividing a subject image as an image of the subject into plural areas in each of the spectroscopic images, obtaining a spectrum of the spectroscopically-separated lights of each area from the plural spectroscopic images, and obtaining a spectral characteristic showing a characteristic of the spectrum with respect to the wavelengths of the spectroscopically-separated lights; and
   analyzing a component of the subject based on the spectral characteristic in at least one area of the plural areas,
   wherein, at the analyzing of the component of the subject, the area having the same spectral characteristic as the spectral characteristic with respect to the light from the light source is eliminated from objects of the analysis of the component.

2. The analysis method according to claim 1, further comprising spectroscopically-separating reflected light obtained by reflecting the light from the light source by a reference material that specularly reflects the light from the light source into plural wavelength ranges, and grasping the spectral characteristic with respect to the light from the light source based on a result of receiving the spectroscopically-separated lights of each of the wavelength ranges and imaging the reference material with respect to each of the wavelength ranges.

3. The analysis method according to claim 2, wherein, at the acquiring of the plural spectroscopic images, the subject and the reference material are imaged together.

4. The analysis method according to claim 1, wherein the plural wavelength ranges include an infrared-light wavelength range.

5. The analysis method according to claim 1, wherein, at the analyzing of the component of the subject, the component is analyzed with respect to each area.

6. The analysis method according to claim 1, further comprising acquiring the plural spectroscopic images by receiving the spectroscopically-separated lights using an imaging device having plural pixels, wherein, at the analyzing of the spectral characteristic, when the subject image is divided into the plural areas, the pixels are used as component elements of the areas.

7. The analysis method according to claim 6, wherein, at the analyzing of the spectral characteristic, the subject image is divided into the plural areas by dividing the subject image with respect to each of the pixels.

8. An imaging apparatus comprising:
a spectroscopic device that spectroscopically separates light from a light source via a subject into wavelength ranges;
an imaging device that receives spectroscopically-separated lights as lights with respect to each of the spectroscopically-separated wavelength ranges and images the subject;
a spectral characteristic analysis unit that divides a subject image as an image of the subject into plural areas in each of plural spectroscopic images obtained by imaging of the subject with respect to each of the wavelength ranges, obtains a spectrum of the spectroscopically-separated lights of each area from the plural spectroscopic images, and obtains a spectral characteristic showing a characteristic of the spectrum with respect to the wavelengths of the spectroscopically-separated lights; and
a component analysis unit that analyzes a component of the subject based on the spectral characteristic in at least one area of the plural areas,
wherein the component analysis unit eliminates the area having the same spectral characteristic as the spectral characteristic with respect to the light from the light source from objects of the analysis of the component.

* * * * *